United States Patent [19]
Ledvina et al.

[11] Patent Number: 4,509,937
[45] Date of Patent: Apr. 9, 1985

[54] POWER TRANSMISSION CHAIN

[75] Inventors: Timothy J. Ledvina; Robert H. Mead, both of Ithaca, N.Y.

[73] Assignee: Borg-Warner Corporation, Chicago, Ill.

[21] Appl. No.: 546,667

[22] Filed: Oct. 28, 1983

Related U.S. Application Data

[63] Continuation of Ser. No. 332,032, Dec. 18, 1981, abandoned.

[51] Int. Cl.³ .............................................. F16G 13/04
[52] U.S. Cl. .................................... 474/213; 474/273
[58] Field of Search ............... 474/212, 213, 273, 156, 474/157, 214; 116/278, DIG. 39–DIG. 41, 335; 198/502, 850–853

[56] References Cited

U.S. PATENT DOCUMENTS

| | | | |
|---|---|---|---|
| 1,422,527 | 7/1922 | Berger | 116/DIG. 41 |
| 1,480,528 | 1/1924 | Morse | 474/157 |
| 2,667,791 | 2/1954 | Bremer | 474/214 |
| 3,340,745 | 9/1967 | McCann | 474/214 |
| 4,051,949 | 10/1977 | Lapeyre | 198/853 |
| 4,342,560 | 8/1982 | Ledvina et al. | 474/213 |

Primary Examiner—James A. Leppink
Assistant Examiner—Frank McKenzie
Attorney, Agent, or Firm—Aubrey L. Burgess

[57] ABSTRACT

A power transmission chain for a sprocket drive is constructed of at least two types of toed links, one engaging sprocket teeth with their outside flanks and the other engaging sprocket teeth with their inside flanks. The links are assembled as uniform sets of links of the same type, in a regular or random mixture of sets. To distinguish the types of links, one type has a curved or arcuate back and the other a flat, generally planar back. An improperly located link can be easily detected in the assembly of links.

3 Claims, 8 Drawing Figures

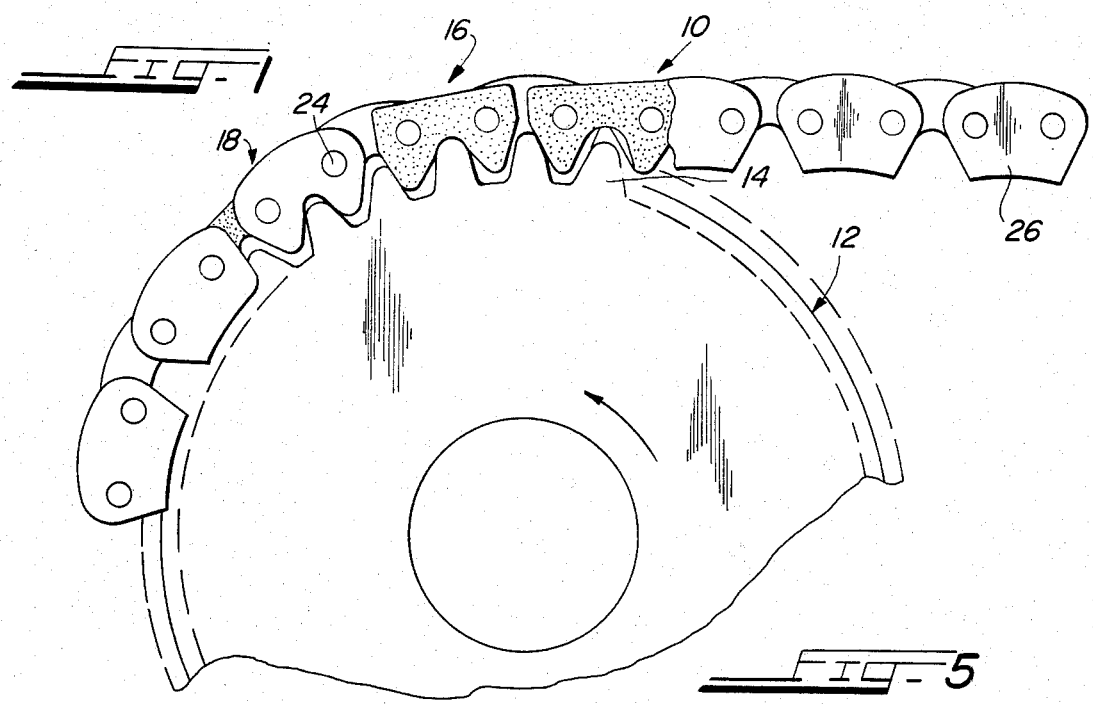
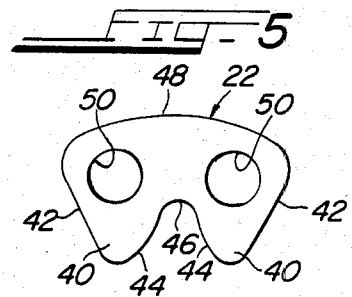
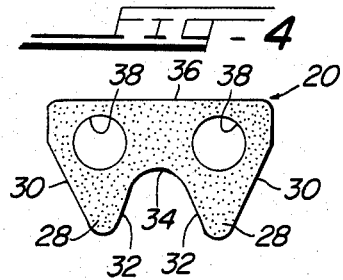
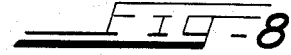
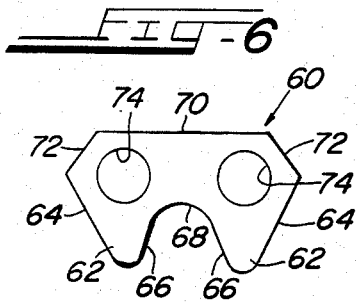
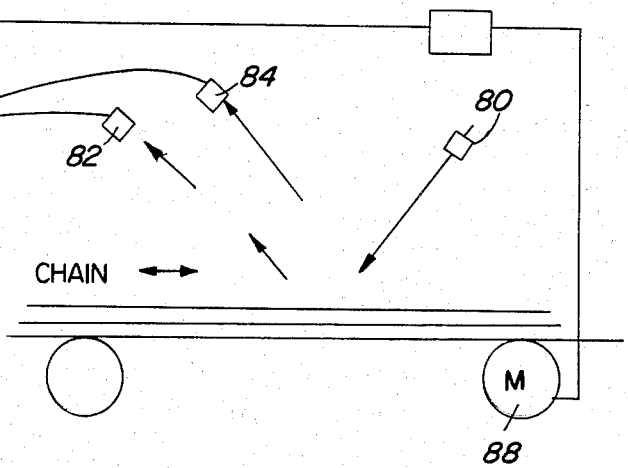

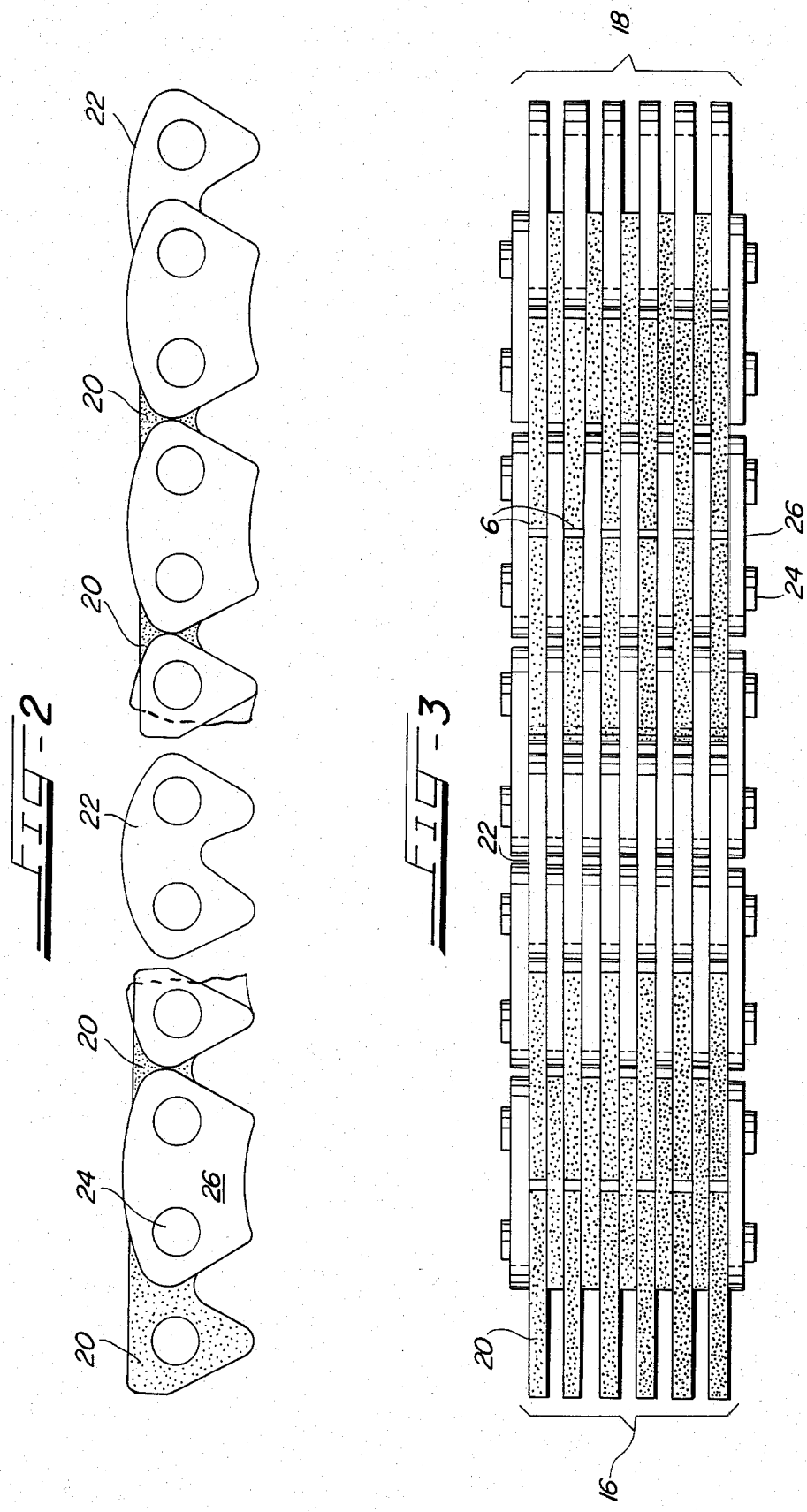

4,509,937

POWER TRANSMISSION CHAIN

This is a continuation of application Ser. No. 332,032 filed Dec. 18, 1981, now abandoned.

BACKGROUND OF THE INVENTION

Power transmission chains composed of pivotably connected sets of interleaved links are known in the art. In one type of chain, commonly known as a "Silent" chain, each of the links which drivingly engage the teeth of a sprocket is defined by a pair of toes, each toe being at the juncture of an inside flank and an outside flank. The inside flanks are joined by a crotch. The backs of these links are generally arcuate or curved.

It has been suggested to construct a chain with some set of links all having inside flanks which drivingly engage the sprocket teeth, and other set of links all having outside flanks which drivingly engage the sprocket teeth. The uniform sets of links (that is, all inside flank engagement or all outside flanks engagement) may be mixed in a regular or random pattern. When all the links in each rank or set of links are uniform, there is a reduction in the apparent noise level or psychological distraction produced by operation of such a chain. Such a chain is described and claimed in our co-pending application, Ser. No. 150,370, filed May 16, 1980.

However, if each set of links is not uniform, the amount of noise reduction is not as great. That is, if one inside flank engagement link is positioned with a plurality of outside flank engagement links to form one set of links, there is a noticeable increase in the noise level when the chain operates. The assembly of uniform ranks or sets of links has proved difficult because the physical difference between the inside flank engagement and outside flank engagement links are physically and visually very small, and do not admit of ready detection by automatic sorting apparatus.

It is therefore a primary object of the present invention is to provide a power transmission chain of the type generally described in the above-identified application, but in which each link has some physical characteristic (other than its flank profile) which readily identifies the links as either an inside flank or outside flank engagement link.

SUMMARY OF THE INVENTION

According to the invention herein described, the two types of links making up the chain are configured to have a physical characteristic such that they are distinguishable from one another. In a preferred embodiment the physical characteristic modified is the back surface shape, where the back surface is that farthest from the toes. When so modified, the links can be visually, electrically, mechanically, optically, or otherwise inspected to identify and separate the different link types. One of the link types in the preferred embodiment has an arcuate or curved back surface while the other type of link has a generally flat, planar surface. The ends of the latter can be angled if so desired. By using the links types with a physical characteristic modified according to this invention, the proper mixture and arrangement of the two types of links in uniform sets are insured to produce a salable, commercial product. This is possible because of the ability to differentiate between the link types before assembly of the chain, thus insuring the assembly of the proper links in each uniform set of links in the chain, and at the proper positions in the chain.

BRIEF DESCRIPTION OF THE DRAWINGS

FIG. 1 is a side view of a portion of a chain and a toothed sprocket, with parts broken away incorporating two types of links according to this invention;

FIG. 2 is a side view of a portion of a typical chain according to this invention, also with parts broken away;

FIG. 3 is a plan view of the portion of the chain of FIG. 2;

FIG. 4 is a side view of one form of link in the chain of FIGS. 1-3;

FIG. 5 is a side view of another form of link in the chain of FIGS. 1-3;

FIG. 6 is a side view of an alternate form of usuable in the chain of FIGS. 1-3;

FIG. 8 is a schematic illustration of an optically-based system for detecting the presence and location of "out-of-place" links in a chain.

DESCRIPTION OF THE PREFERRED EMBODIMENTS

Figure 7:
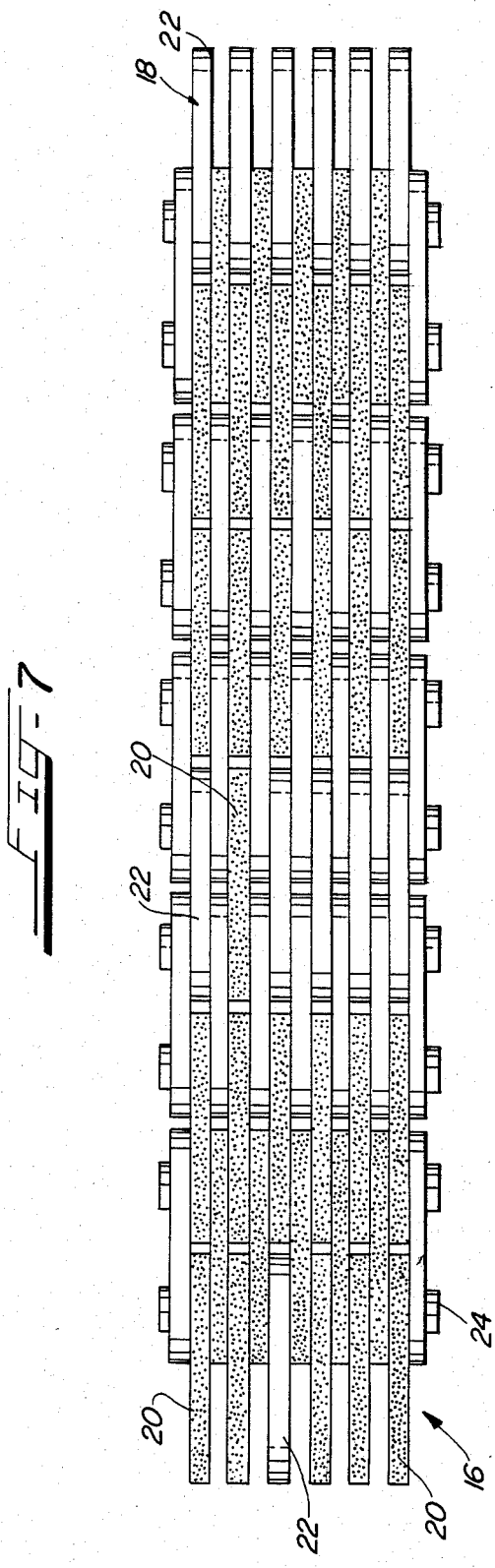
FIG. 7 is a plan view similar to FIG. 3 but showing a chain with some links out of place.

FIGS. 1-3 illustrate a portion of an endless power transmission chain 10 and a toothed sprocket 12 with teeth 14, the chain being composed of sets 16 and 18 of links 20 and 22, the links 20 and 22 being different in shape as better illustrated in FIGS. 4 and 5. In FIGS. 2 and 3, the links 20 of sets 16 are stippled to further distinguish them from the links 22 of sets 18. The sets 16 and 18 of links are pivotably interconnected by pivot means 24, shown as round pins. A pin and rocker joint in which one member rocks on another, as known in the art, can be used if so desired. Also shown are guide links 26 which are provided along the outside of the chain to maintain sprocket tooth-chain engagement. The guide links do not drivingly engage the sprocket teeth. The illustrated guide links 26 are outside guide links and flank the sprocket teeth. Inside guide links (not shown) which ride in a sprocket groove can be used if desired.

FIG. 4 shows one link 20 having a pair of toes 28,28, each defined by diverging flanks 30, 32, the flanks 30 being outside flanks and the flanks 32 being inside flanks. The flanks 32 are joined by a crotch 34. The back of the link is a flat surface 36. It will become apparent that flat back surface 36 of link 20 is the physical characteristic modfified (flattened) to identify link 20. As illustrated, the flanks are generally straight. Apertures 38, 38 are provided to receive pins or the pin-rocker joint. This link drivingly contacts the sprocket teeth with the outside flanks.

FIG. 5 shows a link 22 having a pair of toes 40, 40, each defined by diverging flanks 42, 44, the flanks 42 being generally straight outside flanks and the flanks 44 being arcuate inside flanks. The flanks 44 are joined by a crotch 46. The back of the link is an arcuate surface 48. Apertures 50, 50 are provided in the link to receive the pins or pin-rocker joints. The links 22 drivingly contact the sprocket teeth with their inside flanks.

The link 60 illustrated in FIG. 6 is an alternate form of the link 20 of FIG. 4. The link 60 has toes 62 defined by diverging outside flanks 64 and inside flanks 66, the flanks 66 being joined by a crotch 68. The back of the links has a flat surface 70 and angled end surfaces 72;

apertures 74, 74 are provided to receive the pivot means.

While the configuration of the backs of the links are associated with a particular type of link, it is to be understood that the inside flank engaging link could be provided with a flat back, and the outside flank engaging link could be provided with the arcuate back without departing from the spirit of the invention. Moreover, other physical characteristics can be modified to identify the inside or outside flank engagement of each link. For example, all inside flank engagement links can be sprayed with a paint having a color different than that sprayed on other types of links. The finished links can then be illuminated by a light, the reflected light detected and, after examination for the apropriate color spectrum, the link type verified. Alternatively, links of a given type can be magnetized or irridated with a low level of radioactive energy, and the resultant links identified by the presence or absence of the magnetization or the radioactive emission. It has been found most practical and economical to utilize a simple physical modification, such as the shape of the link back surface, in the implementation of this invention.

A chain with some links wrongly located is illustrated in FIG. 7. The links 20, those without outside flank engagement and the flat backs, are stippled to distinguish them from links 22, the inside flank engagement links with curved backs. The two out-of-place links are readily apparent in FIG. 7. A chain with such out-of-place links will be rejected and then brought into specification by substituting the proper links or sets of links in the assembly.

In the manufacture of chains, the links are stamped from sheet steel, treated to improve their physical properties, and ultimately assembled into the final product. The links are transported from the forming to the assembly positons in bins which may hold several thousand links. It thus becomes easy to intermix the link types, especially when the link thickness and pitch (the distance between pivot means centers) are the same. The links are fed into automatic assembling machines, which assemble the sets of links in a relatively long length of chain. Sections of the relatively long length of chain are broken-out into segments of predetermined length, and the ends of each segment are joined by a pivot means to form the chain loops usuable in a sprocket drive.

The automatic assembling machines are adjusted to handle only one type of link and to reject the other, and to assemble the uniform sets of links in the desired fashion, such as in a random mixture of sets or in a particular arrangement of sets. Even when the machines are adjusted to reject the wrong link, at times the wrong link type "sneaks" through. By using the links with a modified physical characteristic as taught herein, the erroneous link can be easily detected, and the correction made.

FIG. 8 illustrates, schematically, an optical device for detecting the presence and location of "out-of-place" links in a set of links. In that chain is produced in relatively long lengths, the chain is conveyed in a generally horizontal path beneath a transverse series of light sources 80 positoned to direct a light toward the back of the chain 10, so some light is reflected from the chain's back surface. The differently configured backs of the links will reflect light differently. Light is reflected from flat surfaces 36 of links 20 in a relatively narrow, cylindrical beam which impinges only on a first array of sensors 82. Light is reflective from curved surfaces 48 of links 22 in a much broader, diverging beam which strikes arrays of both pickups, 82 and 84. The reflected light is picked-up by sensors or pick devices 82, 84, which are connected to an indicator or recording devices 86 which visually, audibly or otherwise indicates the link mixture. An out-of-place link is indicated by an incorrect reflected signal. Device 86 is electrically coupled to a motor 88 of the conveyor drive system. The signal for an out-of-place link can de-energize motor 88 and stop the conveyor, and/or the location of the out-of-place link can be marked for later correction.

A mechanical, electro-mechanical or pneumatic inspection device can be provided in lieu of the optical system described. These can use feelers, either in a pure mechanical system or in an electro-mechanical system, or air jets in a pneumatic system.

A "set" of links, as used herein and in the appended claims, means a group of links disposed in one row or rank transversely across the width of the chain, and connected by two adjacent pivot means. For example, a single set of links, with each link aligned one behind the other, would appear similar to the single link 20 in FIG. 4 or the single link 22 in FIG. 5. A first pivot would be inserted into one of the apertures 38 of each of the links 20 in the set, and a second pivot or rod would be inserted into the other apertures 38 of the same set of links.

While only a particular embodiment of the invention has been described and claimed herein, it is apparent that various modifications and alterations of the invention may be made. It is therefore the intention in the appended claims to cover all such modifications and alterations as may fall within the true spirit and scope of the invention.

We claim:

1. A power transmission chain adapted for use in a toothed sprocket drive system comprising: a plurality of links arranged in interleaved sets, pivot means interconnecting the link sets, each link having a back surface, and having a pair of toes defined by converging inside flanks and outside flanks, the inside flanks being joined by a crotch, the links of some of said sets of links being so constructed and arranged to drivingly contact the teeth of a sprocket on the inside flanks of the links and the links of other sets of links being so constructed and arranged to drivingly contact the teeth of a sprocket on the outside flanks of the links, characterized in that the links in one of said sets have an arcuate back surface and the links in others of said sets have a flat, generally planar back surface, thus to differentiate between the types of links.

2. A power transmission chain adapted for use in a toothed sprocket drive system comprising: a plurality of sprocket tooth engaging links arranged in interleaved sets, pivot means interconnecting the link sets, each link having a back surface, and having a pair of toes each defined by a converging inside and outside flank, the inside flanks of each link being joined by a crotch, the links of some sets having certain configured flanks and other sets of links having at least some flanks of a configuration different from the flanks of said some sets of links; characterized in that the links of said some sets of links have a back surface of one shape and the links in said other sets of links have a back surface of a different shape, thus to differentiate between the types of links when viewed from their back surfaces.

3. A power transmission chain as recited in claim 2 in which said links in said some sets of links have arcuate back surfaces and said links in said other sets of links have a generally planar back surface.

* * * * *